No. 721,559. PATENTED FEB. 24, 1903.
G. W. GOODRIDGE.
BINDING SCREW FOR ELECTRICAL CONNECTIONS.
APPLICATION FILED DEC. 2, 1902.
NO MODEL.

WITNESSES:
F. W. Wright
E. W. Collins

INVENTOR
GILBERT W. GOODRIDGE
BY
Howson and Howson
HIS ATTORNEYS.

UNITED STATES PATENT OFFICE.

GILBERT W. GOODRIDGE, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

BINDING-SCREW FOR ELECTRICAL CONNECTIONS.

SPECIFICATION forming part of Letters Patent No. 721,559, dated February 24, 1903.

Application filed December 2, 1902. Serial No. 133,577. (No model.)

*To all whom it may concern:*

Be it known that I, GILBERT W. GOODRIDGE, a citizen of the United States of America, residing in Bridgeport, Connecticut, have invented a Binding-Screw for Electrical Connections, of which the following is a specification.

My invention relates to that class of binding screws or posts for electrical connections and other purposes in which a washer is employed under the head of the screw; and the object of my invention is to so construct such a binding-screw and washer as to make them more convenient in use than are screws and washers as ordinarily constructed.

Figure 1:
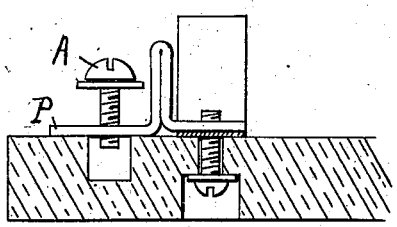
Figure 2:
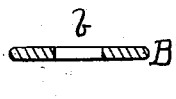
Figure 3:
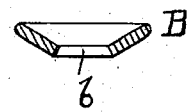
Figure 4:
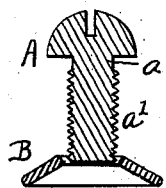
Figure 5:
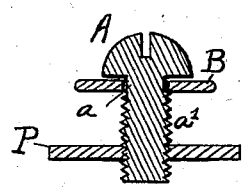

In the accompanying drawings, Figure 1 is a sectional view illustrating one application of my invention. Figs. 2, 3, and 4 are sectional views, drawn to a larger scale, illustrating the manner of making my combined washer and screw. Fig. 5 is a sectional view of the finished screw with its washer in place.

Ordinarily washers used in conjunction with binding-screws have their openings of such size that the threaded stems of the screws pass freely through them. In electrical work particularly this carries with it the objection that to connect up the bared end of a conductor under the washer the latter has to be lifted by the end of the screw-driver or by the fingers of the operator after screwing back the binding screw or post. To avoid this and to facilitate the wireman's work and also to diminish its dangers, I connect the washer with the neck or under the head of the screw in such a manner that while the washer is free to turn on the screw or the latter is free to turn in the washer the raising of the screw by turning it backward with a screw-driver or otherwise will cause the washer to rise with it.

As a convenient way of carrying this invention into effect I form the screw A with the neck $a$ of a slightly-less diameter than the threaded portion $a'$ of the stem. I then form the washer B, Fig. 2, with an opening $b$ of a diameter slightly greater than the neck $a$ of the screw, but normally slightly less than the diameter of the threaded portion $a'$. I then cup the washer B—as illustrated in Fig. 3, for instance—so as to enlarge the diameter of the central opening $b$ sufficiently to enable it to pass over the threaded portion $a'$ of the stem of the screw. When under the head of the screw, I then flatten the washer B back to its original form, Fig. 2, with the result that, as shown in Fig. 5, the washer B will be held under the head of the screw A, yet free to turn thereon. Thus when the washered screw has been threaded into a connection-plate, such as P, and it is desired to connect up the bared end of a conductor under the washer the turning back of the screw A by a screw-driver will at the same time lift the washer B, so that the bared end of the conductor can be at once put in place and the screw turned down to cause the washer to bind firmly on the conductor.

It will be understood that my improvements may be applied to other than electrical uses; but for the reasons I have explained it is especially useful in that connection.

I claim as my invention—

1. The herein-described binding-screw, having a washer under its head, mounted but free to turn on the neck of the screw, substantially as described.

2. The herein-described binding-screw having a reduced neck with a washer on the said neck, the washer being provided with a central opening of slightly-larger diameter than the reduced neck, but less than that of the threaded portion of the screw, substantially as described.

In testimony whereof I have signed my name to this specification in the presence of two subscribing witnesses.

GILBERT W. GOODRIDGE.

Witnesses:
    FRANK V. BURTON,
    JOHN TAYLOR.